UNITED STATES PATENT OFFICE.

CLARENCE A. FULLERTON, OF NEW YORK, N. Y.

REINFORCED GLASS.

1,197,474.

Specification of Letters Patent.

Patented Sept. 5, 1916.

Application filed October 16, 1913. Serial No. 795,575.

*To all whom it may concern:*

Be it known that I, CLARENCE A. FULLERTON, citizen of the United States, residing at New York, in the county of New York and State of New York, have invented certain new and useful Improvements in Reinforced Glass; and I do hereby declare the following to be a full, clear, and exact description of the invention, such as will enable others skilled in the art to which it appertains to make and use the same.

This invention relates to reinforced glass showing a variety of designs in place of the woven wire showing a uniform pattern embedded in the glass, now known as wired glass.

An object of this invention is to provide an improved means of manufacturing reinforced glass in which a number of designs and reinforcements may be fastened together to form a continuous web or plate.

A further object of this invention is the provision of improved means for tying a series of designs in a convenient form to form a continuous web which is subsequently provided with plates or sheets of glass to form a continuous web of reinforced glass.

Further objects will be apparent from the following specification, appended claims and drawings in which:

Figure 1 is a plan view of a web comprising a plurality of blanks secured to one another preparatory to receiving the glass and Fig. 2 is a cross sectional view through the web showing the relative position of the reinforcements in the finished product.

In the manufacture of reinforced glass it is necessary that to make the product practical, it must be made in sufficient quantities to justify the outlay. As it would not warrant the expense to make a few sections of reinforced glass of any one particular design, this invention enables the duplication of one or as many designs as desired and provides that these designs may be fastened to one another to form a continuous flexible web, which web may be applied as a single unit by being embedded in molten glass in any desired manner.

The reinforcing material may be embedded in the glass in any of the several methods now known for the manufacture of reinforced glass. For instance—where glass is made by placing a billet of molten or semi-molten glass upon a bed and passing a roller over the glass to produce a plate of the desired thickness and feeding the reinforcing material on to the upper surface of this plate of glass over which, a serrated roller embeds the reinforcement in the sheet of molten or semi-molten glass, the reinforcements as described in this application may be fed to the glass in the usual manner. In another method of manufacturing this glass the molten glass may be poured upon the bed where it forms a sheet of glass, then the reinforcement may be placed upon this sheet of glass after which, a second layer of molten glass is placed upon the first layer of glass and reinforcement, to form a sheet of reinforced glass after the glass has hardened. The reinforcement may also be embedded in glass by feeding the reinforcement together with semi-molten glass between rollers, in which process, the reinforcement will be fed centrally between the rollers so that it may be centrally disposed through the sheet of glass made in this manner.

Upon the completion of the manufacture of the reinforced glass, the several sections may be removed and used independently of the rest. In building up the web of reinforcement the sections to be used are assembled in an approved manner to present the most compact form, said blanks being disposed to have reinforced material added to the ends of some of said sections or between some of said sections to form selvages or said sections may be fastened directly to one another in various manners as will be described.

Referring to the drawings there is shown a web comprising a selvage 10 to which are secured the sections 11—12 and 13. Other sections 14—15—16—17—18 and 19 may be secured to the sections 11—12 and 13 as shown in which various forms of fastening means are used.

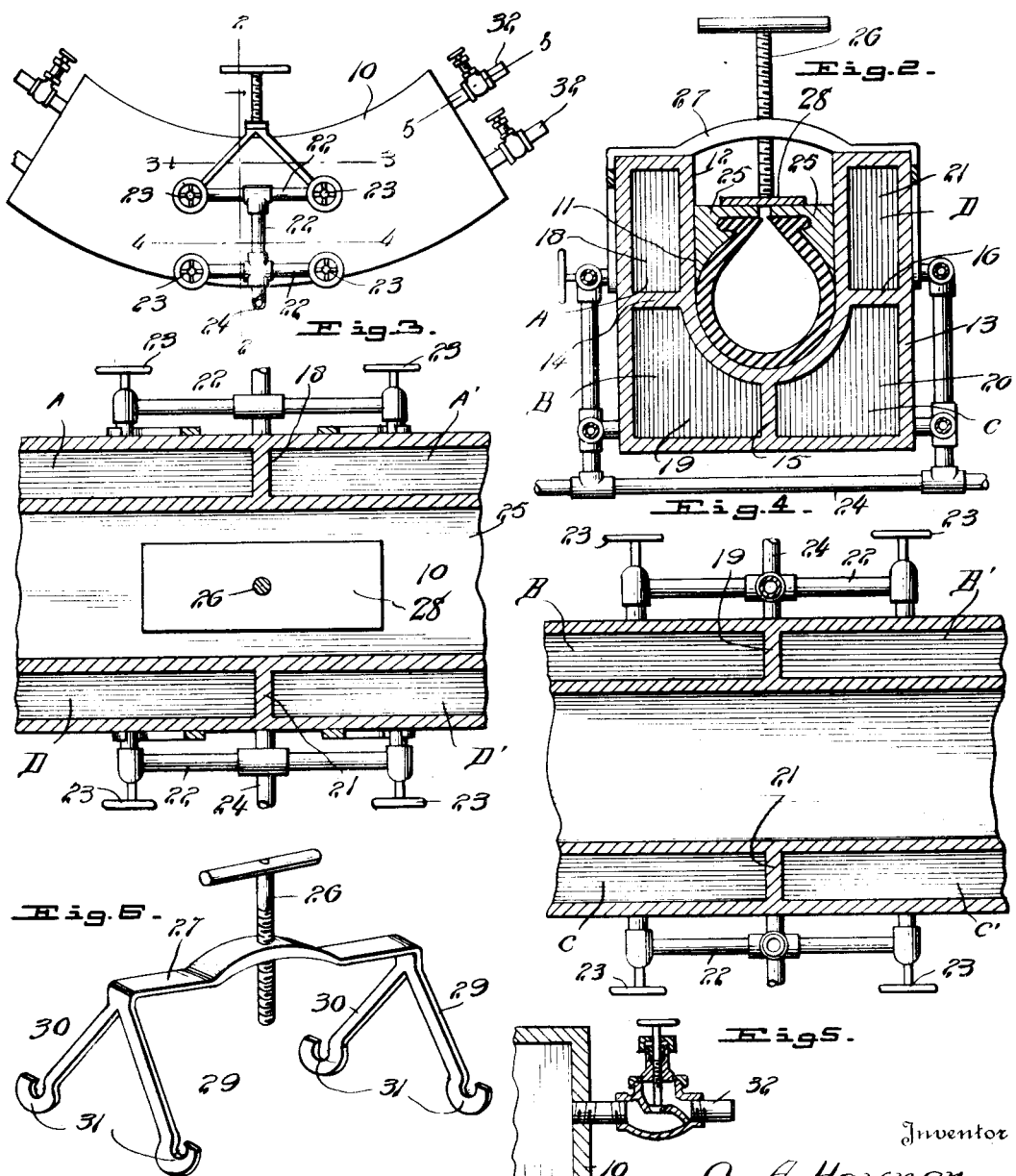

The section 11 may be secured to the selvage 10 which has a strip of wire mesh soldered or otherwise secured as at 20. The section 12 has tongues 21 formed on the blank which may be looped in portions of the wire mesh 10 and the sections 11 and 12 are shown as having tongues 22 from the edges thereof through which rivets 23 are passed. The sections 12 and 13 are secured to one another by a strand of wire or similar material 24 being laced through open-